United States Patent
Chou et al.

[19]

[11] Patent Number: 6,029,765
[45] Date of Patent: Feb. 29, 2000

[54] POWERTRAIN MOUNTING APPARATUS FOR A MOTOR VEHICLE

[75] Inventors: Shui-Fang Chou, Troy; Han C. Wang; Lee Fong Ho, both of Ann Arbor, all of Mich.

[73] Assignee: Ford Global Technologies, Inc., Dearborn, Mich.

[21] Appl. No.: 08/819,642

[22] Filed: Mar. 17, 1997

[51] Int. Cl.[7] .................................................. B60K 5/00
[52] U.S. Cl. ........................ 180/292; 280/784; 180/299
[58] Field of Search .................... 180/291, 292, 180/297, 298, 299; 280/748, 784; 188/371

[56] References Cited

U.S. PATENT DOCUMENTS

| | | | |
|---|---|---|---|
| 5,131,286 | 7/1992 | Sturges et al. | 188/371 |
| 5,251,932 | 10/1993 | Ide | 280/784 |
| 5,267,630 | 12/1993 | Watanabe et al. | 180/297 |
| 5,335,745 | 8/1994 | Goor | 180/232 |
| 5,372,216 | 12/1994 | Tsuji et al. | 180/274 |
| 5,375,821 | 12/1994 | Toshimitsu et al. | 267/140.12 |
| 5,454,453 | 10/1995 | Meyer et al. | 280/784 |
| 5,492,193 | 2/1996 | Guertler et al. | 180/232 |
| 5,605,353 | 2/1997 | MNoss et al. | 280/784 |
| 5,685,599 | 11/1997 | Kitagawa | 280/784 |
| 5,775,172 | 7/1998 | Fevre et al. | 188/371 |
| 5,884,963 | 3/1999 | Esposito et al. | 280/784 |

FOREIGN PATENT DOCUMENTS 1-186429  7/1989  Japan ..................................... 180/292

*Primary Examiner*—Kenneth R. Rice
*Assistant Examiner*—Frank Vanaman
*Attorney, Agent, or Firm*—Gregory P. Brown

[57] ABSTRACT

A powertrain (12) including a transmission (16) and an engine (18) is supported on a motor vehicle structure (10) by a plurality of powertrain mounting brackets. At least one of the powertrain mounts (22) includes a plate member (40) having therein an elongated aperture 42 with first and second protuberances (70, 72) for providing releasable retention of the powertrain mounting bracket (20) and powertrain (12) relative to a structural member (22) of the motor vehicle structure (10). This powertrain mounting bracket (22) is useful for allowing the powertrain to shift forward a predetermined amount when subjected to a substantial inertial force.

15 Claims, 2 Drawing Sheets

POWERTRAIN MOUNTING APPARATUS FOR A MOTOR VEHICLE

BACKGROUND OF THE INVENTION

1. Field of the Invention

This invention relates generally to powertrain mounting brackets. More particularly, the present invention relates to a powertrain mounting bracket adapted to allow the powertrain to slide forward in the vehicle when inertial loads generated by the powertrain exceed a predetermined amount.

2. Disclosure Information

Various kinematic and break-away engine mounting devices have been proposed in the literature to allow movement of the powertrain mass during collapse of the motor vehicle structure. These approaches are generally directed to minimizing the intrusion into the passenger compartment of the motor vehicle. Therefore, they typically direct the engine downward and rearward as the forward portion of the vehicle structure collapses.

It has been determined that advantages in energy management during the collapse of the front structure could be obtained if the powertrain mass could be moved forward in the vehicle while still be positively restrained. For instance, this could allow for energy dissipation by structural members further back in the structure than previously possible, thus resulting in less overall crush space being required to manage a given amount of energy.

It would therefore be desirable to provide a powertrain mounting bracket capable of moving the powertrain forward when exposed to a force in excess of a predetermined magnitude. It would be further desirable for this powertrain mounting bracket to maintain positive retention of the powertrain.

SUMMARY OF THE INVENTION

According to the present invention, a novel powertrain mounting apparatus for supporting a powertrain within a motor vehicle has been discovered. The mounting apparatus attaches an engine and transmission to a vehicle structure, while providing additional clearance for energy management as the vehicle structure collapses. The powertrain mounting apparatus comprises a plate member rigidly adapted to be connected to the powertrain member having an elongated aperture disposed therein. The elongate aperture includes first and second ends defining a predetermined orientation with first and second longitudinal edges extending therebetween.

A fastener is provided for fastening the plate member to a structural member of the vehicle structure. The fastener includes a rod portion extending through the elongated aperture adjacent to the first end.

The elongate aperture also includes a first protuberance disposed on the first longitudinal edge adjacent to the rod portion and spaced from the first end and a second protuberance disposed on the second longitudinal edge opposite from the first protuberance.

Advantageously, the protuberances of the powertrain mounting bracket deform when forced against the rod portion by a force in excess of a predetermined minimum allowing the plate, and the powertrain member attached thereto, to be displaced along the predetermined orientation guided by the longitudinal edges of the elongated aperture.

DETAILED DESCRIPTION OF THE PREFERRED EMBODIMENT

Figure 1:
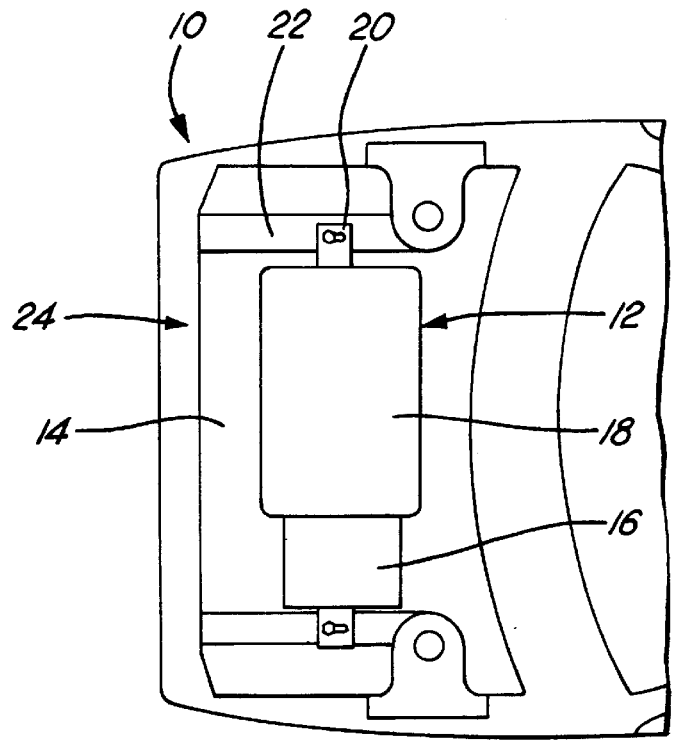
FIG. 1 is a top view of a front vehicle structure having a powertrain mounted therein in accordance with the present invention.
Figure 2:
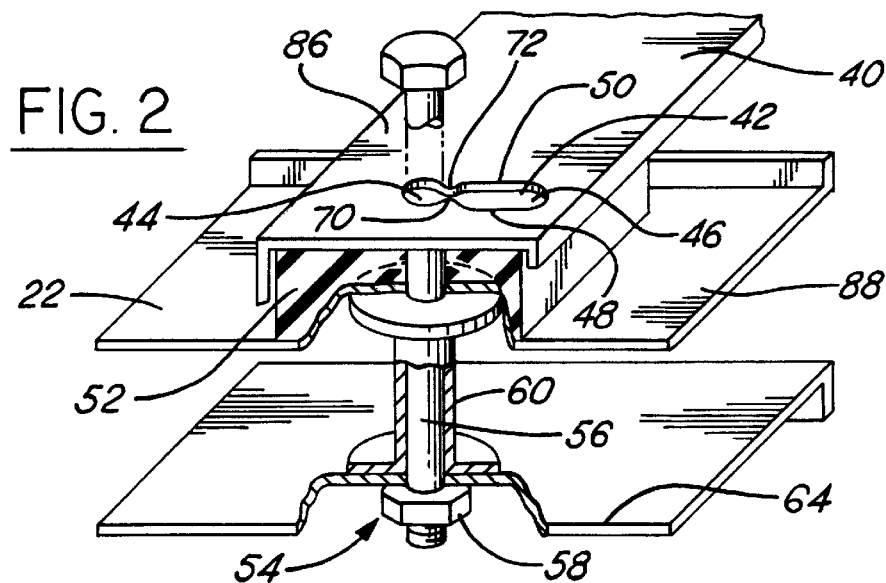
FIG. 2 is a perspective view of a powertrain mounting bracket according to the present invention.

Referring now to FIGS. 1 and 2, a front portion 10 of a motor vehicle is shown. A front wheel drive powertrain 12 is shown mounted in the engine compartment 14. The powertrain includes a transmission 16 operatively connected to an engine 18. It should be noted that a rear wheel drive configuration could also be mounted in the motor vehicle in accordance with the present invention. The powertrain is supported by several powertrain mounting brackets 20 attached to structural member 22 of the motor vehicle structure 24.

These powertrain mounting brackets 20 are similar in function and therefore only one will be described, it being understood that the other powertrain mounting brackets 20 may incorporate similar elements and functionality. Furthermore, the term "structure" when used in this specification and claims will be understood to refer to components of either a conventional vehicle chassis having body on frame construction or a conventional unitary chassis and body construction, which may or may not incorporate subframes therein. In any event, the structure makes up a part of the sprung mass of the vehicle and provides a foundation for supporting the powertrain and suspension components attached thereto.

Referring now to FIG. 2, powertrain mounting bracket will now be described in greater detail. A plate member 40 is rigidly attached in a conventional manner to the powertrain. For example, this can be accomplished using threaded fasteners to engage threaded embossments cast in the powertrain engine or transmission or it can be attached via a weldment or any equivalently robust attachment device known by those skilled in the art.

An elongated aperture 42 passes through the plate member 40 and includes first and second ends 44, 46. The first and second ends 44, 46 preferably define a predetermined orientation for the elongated aperture 42, which in the preferred embodiment lies substantially parallel to a longitudinal axis of the motor vehicle. The elongated aperture 42 also includes first and second longitudinal edges 48, 50 extending between the first and second ends 44, 46.

An elastomeric pad 52 may be disposed between the plate member 40 and a structural member 22 to isolate the vehicle structure from vibrations generated by the powertrain. A fastener device 54, such as a threaded rod 56 with a cooperating threaded nut 58 extends through the elongated aperture 42 adjacent to the first end 44 and into the structural member 22 to provide a fastening clamp load for retaining the powertrain mounting bracket in a fixed relationship with the vehicle structure. A reinforcing member 60 may be disposed between walls 62, 64 of the structural member 22 to prevent distortion thereof in operation.

Figure 3:
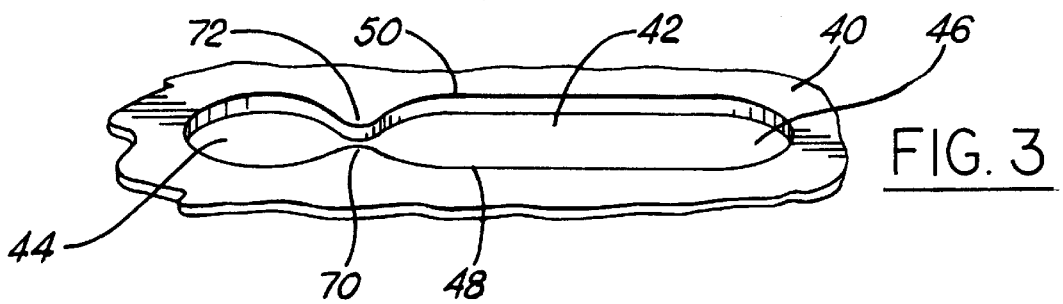
FIG. 3 is a partially sectioned perspective view of a plate member having an elongate aperture according to the present invention.
Figure 4:
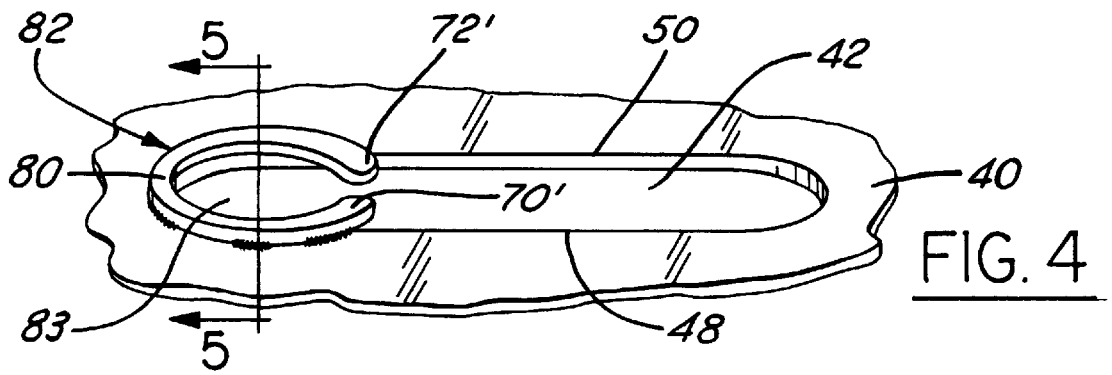
FIG. 4 is a partially sectioned perspective view of a plate member having an alternative embodiment of an elongate aperture according to the present invention.
Figure 5:
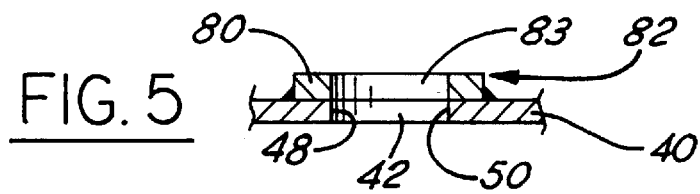
FIG. 5 is a sectional view taken from FIG. 4.

Referring now to FIGS. 2 and 3, the plate member 40 of the mounting bracket 20 also includes a first protuberance 70 extends outward from the first longitudinal edge 48 into the elongated aperture 42 and spaced from the first end 44 to allow for the threaded rod 56. A second protuberance 72 extends outward from the second longitudinal edge 50 into the elongated aperture 42 and opposite from the first protuberance 70. The first and second protuberances may be integrally formed with the plate member 40 when the elongated aperture 42 is formed. Alternatively, as can be seen in FIGS. 4 and 5, the protuberances 70', 72' may be formed by welding or otherwise securing a center portion 80 of a split washer 82 to the plate member 40. The split washer 82 includes an aperture 83 therethrough oriented to overlay the first end of the elongated aperture and to receive the rod 56 therethrough. The split washer 82 includes first and second ends which project into the elongated aperture from the first and second edges 48, 50, thereby operatively forming the first and second protuberances 70', 72'.

Figure 6:
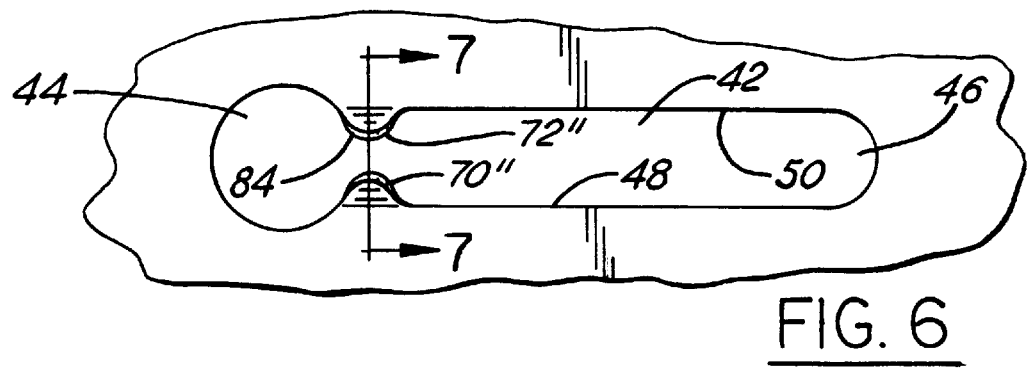
FIG. 6 is a partially sectioned perspective view of a plate member having an alternative embodiment of an elongate aperture according to the present invention.
Figure 7:
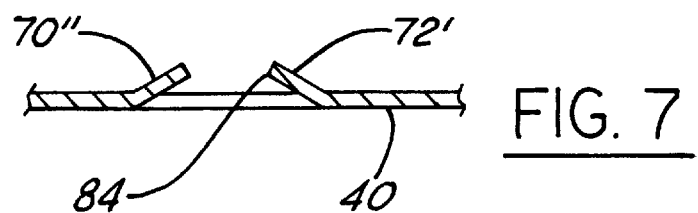
FIG. 7 is a sectional view taken from FIG. 6.

Referring now to FIGS. 6 and 7, an alternative construction of the elongated aperture is illustrated. As shown, it may be advantageous to form the elongate aperture 42 having the first and second longitudinal edges 48, 50 spaced closer together between the second end 46 and the first and second protuberances 70", 72" than they are spaced together between the first and second protuberances 70", 72" and the first end 44, which of course corresponds to the diameter of rod 56. Additionally, further advantage may be obtained by upturning or beveling the leading edges 84 of the protuberances 70, 72.

Referring back now to FIGS. 1 & 2, under normal operation of the powertrain mounting bracket 20, the engine and transmission are retained in their respective operating positions. Accordingly, the rod 56 stays within the region of the elongated aperture 42 between the protuberance 70, 72 and the first end 44. As the vehicle encounters impacts, inertial forces within the powertrain are transferred to the powertrain mounting brackets 20. When the force at the bracket exceeds the predetermined minimum, the rod 56 will deform the protuberances 70, 72, allowing the plate member 40 and the powertrain to slide relative to the structural member 22.

In the presently preferred embodiment, the elongated aperture 42 is oriented to guide the powertrain to slide forward in the vehicle, substantially parallel to the longitudinal axis of the motor vehicle. It has also been observed that it is desirable to place the elongated aperture 42 in a planar portion 86 of the plate member 40, and to orient the mounting bracket 20 in the vehicle such that this planar portion 86 is substantially parallel to a planar portion 88 of the structural member 22.

The foregoing description presents a few embodiments of the present invention. Details of construction have been shown and described for purposes of illustration rather than limitation. Modifications and alterations of the invention will no doubt occur to those skilled in the art that will come within the scope and spirit of the following claims.

What is claimed:

1. A powertrain mounting apparatus for a motor vehicle having a powertrain including an engine operatively connected to a transmission, supported on a vehicle structure, said powertrain mounting apparatus comprising:

a plate member rigidly connected to the powertrain;

an elastomeric pad disposed between said plate member and the vehicle structure;

an elongated aperture disposed in said plate member having first and second ends defining a predetermined orientation with first and second longitudinal edges extending therebetween;

fastener means for fastening said plate member to the vehicle structure, said fastener means including a rod portion extending through said elongated aperture adjacent to said first end;

a first protuberance disposed on said first longitudinal edge adjacent to said rod portion and spaced from said first end; and a second protuberance disposed on said second longitudinal edge opposite from said first protuberance;

whereby said protuberances deform when forced against said rod portion by a force in excess of a predetermined minimum allowing said plate, and the powertrain attached thereto, to be displaced along said predetermined orientation guided by said longitudinal edges of said elongated aperture in a forward direction relative to the motor vehicle.

2. A powertrain mounting apparatus according to claim 1, wherein said first and second protuberances are formed integrally with said first and second longitudinal edges.

3. A powertrain mounting apparatus according to claim 1, further comprises a split washer having a aperture therethrough, first and second end portions and a center portion, said center portion being secured to said plate member such that said aperture overlays said first end of said elongated aperture and said first and second end portions operatively form said first and second protuberances.

4. A powertrain mounting apparatus according to claim 2, wherein said first and second protuberances include upturned leading edges adjacent to said rod portion.

5. A powertrain mounting apparatus according to claim 2, wherein said first and second longitudinal edges are spaced closer together between said second end and said first and second protuberances than between said first and second protuberances and said first end so as to provide energy absorption through plastic deformation of said first and second longitudinal edges.

6. A powertrain mounting apparatus according to claim 1, wherein predetermined orientation of said first and second ends of said elongated aperture longitudinal edges lies substantially parallel to a longitudinal axis of the vehicle.

7. A powertrain mounting apparatus according to claim 1, wherein said elongated aperture lies in a planar portion of said plate member, said planar portion having a predetermined planar orientation substantially parallel to a planar portion of said vehicle structure adjacent to said fastener means.

8. A powertrain mounting apparatus for use in a motor vehicle, said powertrain mounting apparatus comprising:

a powertrain member;

a structural member;

a plate member rigidly connected to said powertrain member;

an elongated aperture disposed in said plate member having first and second ends defining a predetermined orientation with first and second longitudinal edges extending therebetween;

fastener means for fastening said plate member to said structural member, said fastener means including a rod portion extending through said elongated aperture adjacent to said first end;

a first protuberance disposed on said first longitudinal edge adjacent to said rod portion opposite said first end; and a second protuberance disposed on said second longitudinal edge opposite from said first protuberance;

whereby said protuberances deform when forced against said rod portion by a force in excess of a predetermined minimum allowing said plate, and said powertrain member attached thereto, to be displaced along said predetermined orientation guided by said longitudinal edges of said elongated aperture in a forward direction relative to the motor vehicle.

9. A powertrain mounting apparatus according to claim 8, wherein said first and second protuberances are formed integrally with said first and second longitudinal edges.

10. A powertrain mounting apparatus according to claim 8, further comprises a split washer having a aperture therethrough, first and second end portions and a center portion, said center portion being secured to said plate member such that said aperture overlays said first end of said elongated aperture and said first and second end portions operatively form said first and second protuberances.

11. A powertrain mounting apparatus according to claim 9, wherein said first and second protuberances include upturned leading edges adjacent to said rod portion.

12. A powertrain mounting apparatus according to claim 9, wherein said first and second longitudinal edges are spaced closer together between said second end and said first and second protuberances than between said first and second protuberances and said first end so as to provide energy absorption through plastic deformation of said first and second longitudinal edges.

13. A powertrain mounting apparatus according to claim 8, wherein predetermined orientation of said first and second ends of said elongated aperture longitudinal edges lies substantially parallel to a longitudinal axis of the vehicle.

14. A powertrain mounting apparatus according to claim 8, wherein said elongated aperture lies in a planar portion of said plate member, said planar portion having a predetermined planar orientation substantially parallel to a planar portion of said structural member adjacent to said fastener means.

15. A powertrain mounting apparatus according to claim 8, further comprises an elastomeric pad disposed between said plate member and said structure member.

* * * * *